United States Patent
Koyama

(10) Patent No.: US 9,604,621 B2
(45) Date of Patent: Mar. 28, 2017

(54) PRESSURE REGULATING VALVE

(71) Applicants: DENSO CORPORATION, Kariya, Aichi-pref. (JP); Advics Co., Ltd., Kariya, Aichi-pref. (JP)

(72) Inventor: Fumitoshi Koyama, Kariya (JP)

(73) Assignee: ADVICS CO., LTD., Kariya (JP)

(*) Notice: Subject to any disclaimer, the term of this patent is extended or adjusted under 35 U.S.C. 154(b) by 0 days.

(21) Appl. No.: 14/571,684

(22) Filed: Dec. 16, 2014

(65) Prior Publication Data
US 2015/0167871 A1 Jun. 18, 2015

(30) Foreign Application Priority Data
Dec. 17, 2013 (JP) .................. 2013-260188

(51) Int. Cl.
F16K 1/42 (2006.01)
B60T 17/04 (2006.01)
B60T 8/36 (2006.01)
B21D 39/04 (2006.01)

(52) U.S. Cl.
CPC ............ B60T 17/04 (2013.01); B60T 8/368 (2013.01); F16K 1/427 (2013.01); B21D 39/046 (2013.01)

(58) Field of Classification Search
CPC ......... F16K 1/427; B60T 17/04; B60T 17/046

USPC ........................................................ 251/362
See application file for complete search history.

(56) References Cited

U.S. PATENT DOCUMENTS

| | | | | |
|---|---|---|---|---|
| 4,842,310 A | * | 6/1989 | Muffke | B60T 17/04 285/334.5 |
| 6,032,692 A | * | 3/2000 | Volz | B60T 8/363 137/599.16 |
| 7,686,280 B2 | * | 3/2010 | Lowery | F16K 7/14 251/331 |
| 8,171,961 B2 | * | 5/2012 | Koyama | F16L 55/11 138/89 |
| 2006/0091725 A1 | | 5/2006 | Ariki et al. | |
| 2009/0224537 A1 | * | 9/2009 | Pliassounov | B60T 17/04 285/331 |

FOREIGN PATENT DOCUMENTS

JP 03-59861 9/1991
JP 2006-151362 6/2006

* cited by examiner

*Primary Examiner* — Matthew W Jellett
(74) *Attorney, Agent, or Firm* — Harness, Dickey & Pierce, P.L.C.

(57) ABSTRACT

A housing projection is formed at a bottom of a second reservoir hole in a housing. According to this, a tip side in a press-fitting direction of a sleeve tends to deform inwardly in a radial direction and escape from the housing in a process of press-fitting the sleeve 88 into the second reservoir hole, since an inner slant part of the tip side of the sleeve contacts to a contacting surface of the housing projection, deformation of the tip side of the sleeve 88 is suppressed.

4 Claims, 3 Drawing Sheets

PRESSURE REGULATING VALVE

CROSS-REFERENCE TO RELATED APPLICATION

This application is based on and claims the benefit of priority from earlier Japanese Patent Application No. 2013-260188 filed Dec. 17, 2013, the description of which is incorporated herein by reference.

TECHNICAL FIELD

The present disclosure relates to a press-fit fixing structure for joining two components airtightly by press-fitting.

BACKGROUND

Conventionally, a method of joining two components airtightly is disclosed in, for example, Japanese Patent Application Laid-Open Publication No. 2006-151362.

The joining method disclosed in the Publication is to join a valve seat to a housing by inserting the valve seat in a hole of the housing and crimping a part of the housing.

Thereby, airtightness between the housing and the valve seat is secured by using a contacting part of an inner wall surface of the housing and a perimeter surface of the valve seat as a sealing part.

Moreover, press-fitting one component into another component is known as another method of joining two components airtightly.

However, when two components are joined by press-fitting and a first component has a thin cylindrical shape, the first component receives a load from a second component inwardly in a radial direction by the press-fitting, and since a tip side in a press-fitting direction of the first component deforms inwardly in the radial direction and may escape from the second component, a problem arises that a surface pressure for securing the airtightness of the sealing part cannot be fully obtained.

SUMMARY

An embodiment provides a press-fit fixing structure that can correctly develop pressure between to components to seal them even when the two components are joined by press-fitting and one of the components has a cylindrical shape.

In a press-fit fixing structure according to a first aspect, the press-fit fixing structure includes a first component having a cylindrical shape, and a second component that has a hole in which the first component is press-fit.

The second component has a deformation suppressing part that suppresses a tip side in the press-fitting direction of the first component from deforming inwardly in a radial direction of the first component.

According to this, since a deformation of the tip side in the press-fitting direction of the first component is suppressed, a surface pressure of a sealing part is fully obtained and an airtightness of the sealing part can be secured reliably.

DETAILED DESCRIPTION OF THE PREFERABLE EMBODIMENTS

Hereinafter, an embodiment of the present disclosure is explained with reference to the drawings.

In addition, in a front-wheel driven four-wheel vehicle, the present embodiment explains an example where a pressure regulating reservoir of the present disclosure is applied to a front-wheel-driven four-wheel vehicle that constitutes a hydraulic circuit in an X piping configuration having each piping system assigned to a front right wheel—rear left wheel, and a front left wheel—rear right wheel.

Figure 1:
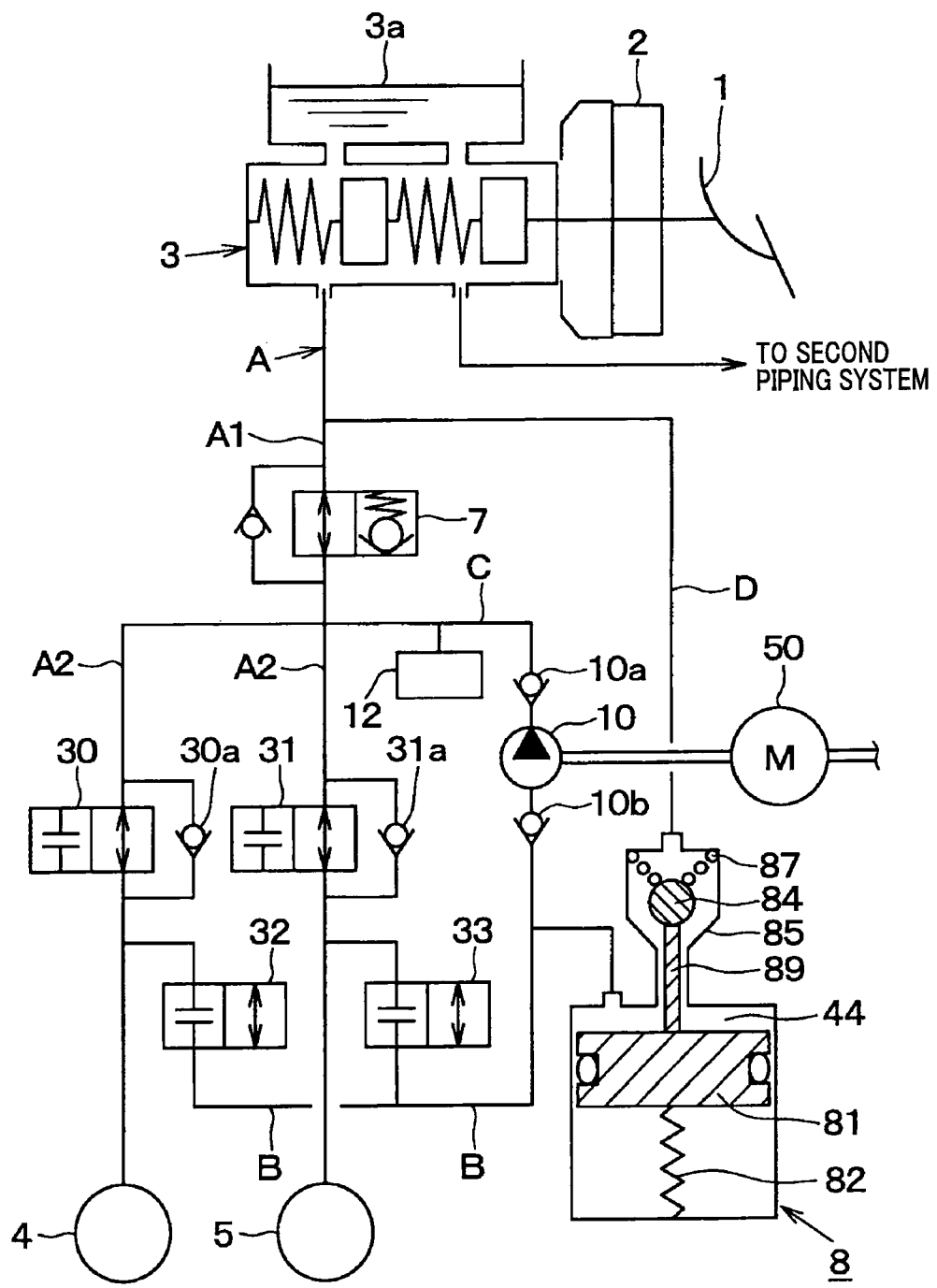
FIG. 1 shows a schematic view of piping of a braking system to which a press-fit fixing structure of an embodiment of the present disclosure is applied.

As shown in FIG. 1, a brake pedal 1 that is a brake operating component, which is stepped on by a driver when applying a braking effort to a vehicle, is connected with a servo unit 2, and a brake stepping force is boosted by the servo unit 2.

The servo unit 2 has a pushrod etc. that transmit the boosted brake stepping force to a master cylinder 3, and a master cylinder pressure occurs when the pushrod presses a master piston disposed in the master cylinder 3.

A brake fluid pressure generator is constituted by the brake pedal 1, the servo unit 2, and the master cylinder 3.

In addition, a master reservoir 3a that supplies a brake fluid into the master cylinder 3 or stores surplus brake fluid from the master cylinder 3 is connected to the master cylinder 3.

The master cylinder pressure is transmitted to a wheel cylinder 4 for the front right wheel FR and a wheel cylinder 5 for the rear left wheel RL, i.e., a wheel braking force generator, through an anti-lock braking system (henceforth ABS).

Although the following explanation explains matters regarding the front right wheel FR and rear left wheel RL, since the details are effectively the same for the front left wheel FL and the rear right wheel RR side, which is a second piping system, and therefore an explanation in this regard is omitted.

The braking system has a conduit line (main line) A connected to the master cylinder 3, and this conduit line A has a differential pressure controlling valve 7.

The conduit line A is divided into two parts by the differential pressure controlling valve 7.

That is, the conduit line A is divided into a conduit line A1 from the master cylinder 3 to the differential pressure controlling valve 7 that receives the master cylinder pressure, and conduit lines A2 from the differential pressure controlling valve 7 to each wheel cylinder 4 and 5.

The differential pressure controlling valve 7 controls an open mode and a differential pressure mode.

Normally, the differential pressure controlling valve 7 is in the open mode, though the pressure in the wheel cylinder 4, 5 side can be maintained higher than that in the master cylinder 3 side by changing the differential pressure controlling valve 7 into the differential pressure mode.

In the conduit lines A2, the conduit line A is branched into two, and a boost controlling valve 30 that controls a boost of the brake fluid pressure to the wheel cylinder 4 is disposed in one of downstream ends of the conduit lines A2, while another boost controlling valve 31 that controls a boost of the brake fluid pressure to the wheel cylinder 5 is disposed in another one of downstream ends of the conduit lines A2.

These boost controlling valves 30 and 31 are constituted as a two-position valve that can control an open/closed mode by an electrical control unit (henceforth ECU, not shown) for the brake fluid pressure control.

When the two-position valve is controlled in the open mode, the brake fluid pressure based on the master cylinder pressure etc. can be applied to each wheel cylinder 4 and 5.

These boost controlling valves 30 and 31 are always controlled in the open mode during the normal braking in which the brake fluid pressure control such as the ABS control is not operated.

In addition, safety valves 30a and 31a are disposed in parallel to the boost controlling valves 30 and 31, respectively, and when the brake pedal 1 is released during the ABS operation, the brake fluid can be removed from the wheel cylinder 4, 5 side conduit lines in connection with the ABS operation.

Moreover, the conduit lines A between the boost controlling valves 30, 31 and each wheel cylinders 4 and 5 are connected to a pressure regulating reservoir 8 by conduit lines B (second conduit lines).

Wheels can be prevented from locking by releasing the brake fluid to the pressure regulating reservoir 8 through the conduit lines B for controlling the brake fluid pressure in the wheel cylinders 4, 5.

Details of the pressure regulating reservoir 8 will be mentioned later.

Moreover, decompression controlling valves 32 and 33 that can control an open/closed mode by the ECU are disposed in the conduit lines B, respectively.

These decompression controlling valves 32, 33 are always in the closed mode during the normal braking (during the ABS is not in operation), and are changed into the open mode suitably when releasing the brake fluid to the pressure regulating reservoir 8.

A pump 10 is disposed together with check valves 10a and 10b in a conduit line C that connects the conduit line A and the pressure regulating reservoir 8 between the differential pressure controlling valve 7 and the boost controlling valves 30 and 31.

Moreover, in order to ease pulsation of the brake fluid when the pump 10 discharged, an accumulator 12 is disposed in the conduit lines C at the downstream side of the pump 10.

Further, a conduit line D (first conduit line) is disposed so as to connect the pressure regulating reservoir 8 and the master cylinder 3, while the pump 10 sucks the brake fluid of the conduit line A1 through the conduit line D and the pressure regulating reservoir 8, and discharges it to the conduit line A2 to boost the wheel cylinder pressure.

Figure 2:
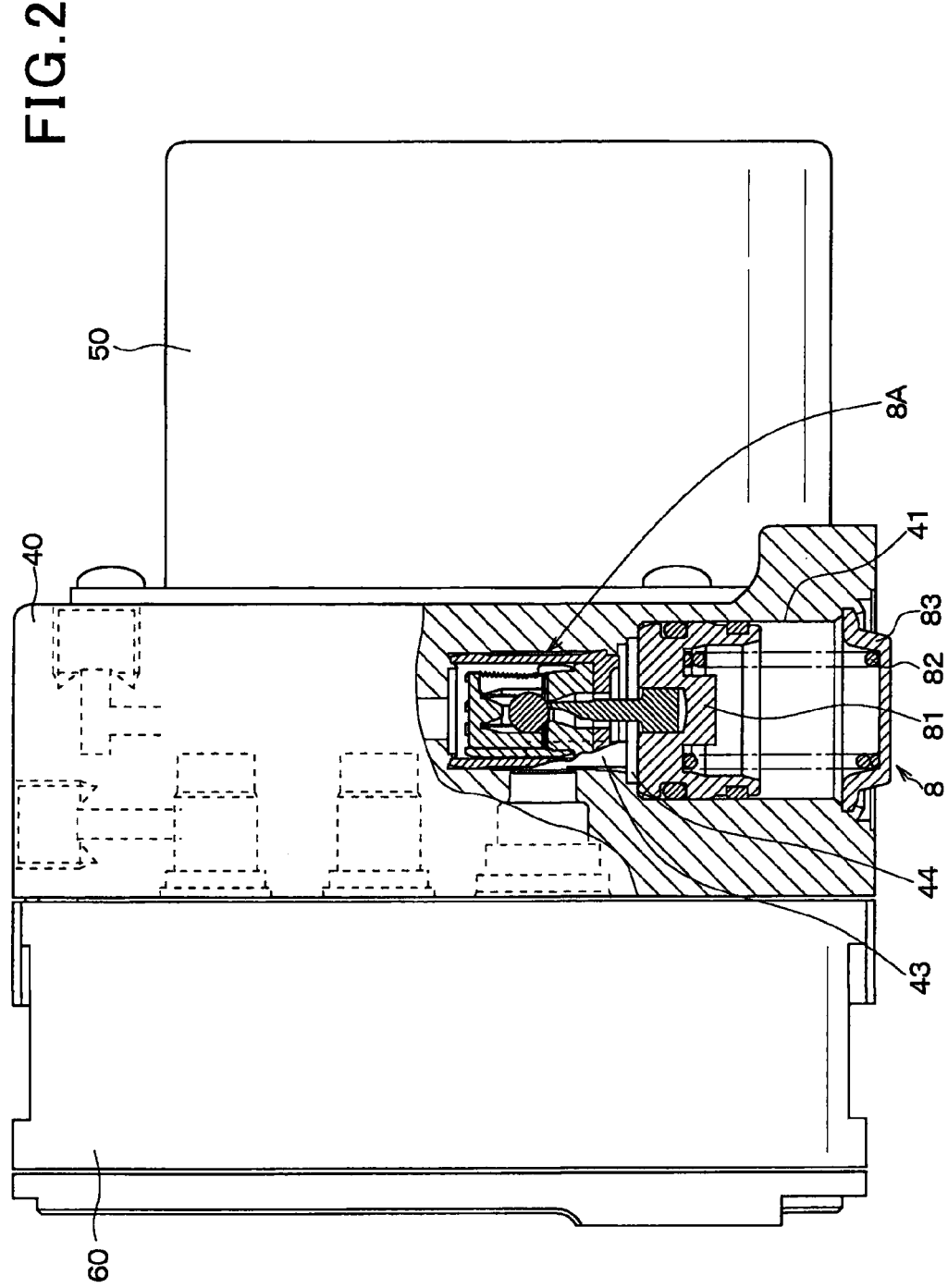
FIG. 2 shows a partially sectional view of a brake fluid pressure regulating unit in the braking system of FIG. 1.

As shown in FIG. 2, a brake fluid pressure regulating unit has a housing 40 with a substantially rectangular parallelepiped shape that constitutes an external form of the brake fluid pressure regulating unit, and the pump 10 and the pressure regulating reservoir 8 are accommodated in the housing 40.

Moreover, an electric motor 50 that drives the pump 10 is disposed at one end of the housing 40.

Furthermore, the ECU is disposed at the other end of the housing 40, and the ECU is covered with a cover 60.

Next, the pressure regulating reservoir 8 mentioned above is explained.

Figure 3:
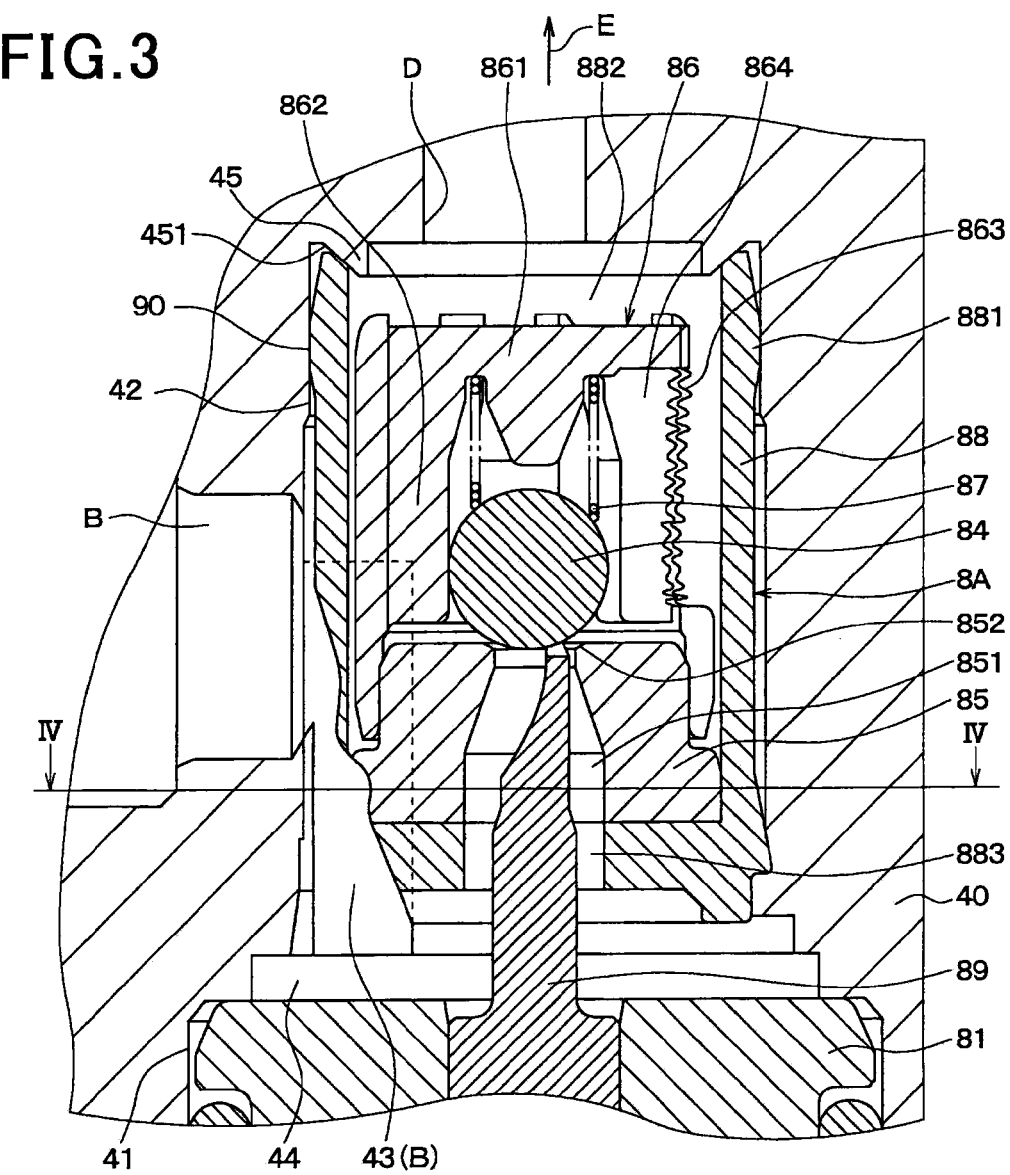
FIG. 3 shows an enlarged sectional view of a principal part of the pressure regulating reservoir in the brake fluid pressure regulating unit of FIG. 2.
Figure 4:
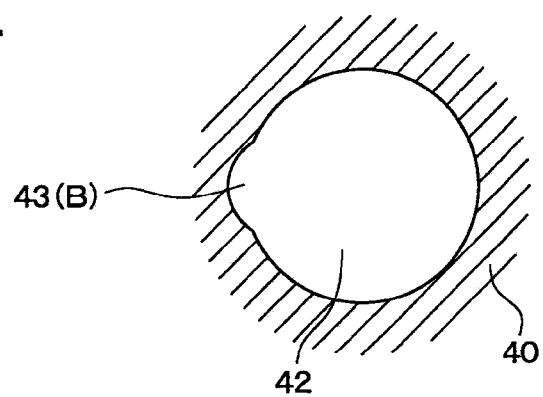
FIG. 4 shows a sectional view of a housing alone taken along a IV-IV line in the brake fluid pressure regulating unit of FIG. 3.

As shown in FIG. 2-FIG. 4, the pressure regulating reservoir 8 has a first reservoir hole 41, a second reservoir hole 42, a release slot 43, and a reservoir chamber 44, which all are constituted by an inner wall surface of a recessed portion formed in the housing 40.

Specifically, both the first reservoir hole 41 and the second reservoir hole 42 are cylindrical spaces, and the second reservoir hole 42 has a smaller diameter than that of the first reservoir hole 41.

Moreover, the first reservoir hole 41 and the second reservoir hole 42 are arranged in series, while the first reservoir hole 41 is formed from one surface of the housing 40, and the second reservoir hole 42 is formed from a base of the first reservoir hole 41.

The release slot 43 is a recessed portion that recesses a part of the second reservoir hole 42 toward outside in the radial direction, and is a part of the conduit line B.

A bottomed cylindrical piston 81 is inserted slidably in the first reservoir hole 41.

The reservoir chamber 44 is formed by the inner wall surface of the housing 40 that constitutes the first reservoir hole 41, and a base wall surface of the piston 81.

The reservoir chamber 44 is for reserving the brake fluid temporarily, and a capacity of the reservoir chamber 44 varies with a reciprocation of the piston 81.

Moreover, there is provided in the first reservoir hole 41 a spring 82 that presses the piston 81 toward the second reservoir hole 42 side in order to generate a force that pushes out the brake fluid in the reservoir chamber 44, and a stopper 83 for fixing the spring 82.

The second reservoir hole 42 is positioned in a side of the reservoir chamber 44 opposite to the piston 81.

A unit constituted by a spherical valve 84, a valve seat 85, filter components 86, another spring 87, and a sleeve 88 is fixed in the second reservoir hole 42.

The valve seat 85 has a substantially cylindrical shape, and has a valve seat passage 851 where brake fluid circulates, and a valve seat surface 852 that is formed in one opening end of the valve seat passage 851, and the valve 84 contacts to and separates from the valve seat surface 852.

The filter components 86 are constituted by arranging six pillar-shaped components 862 at equal intervals around a circle-shaped base part 861, while surrounding circumferences of the pillar-shaped components 862 with a mesh-like filter 863, and have a substantially cup shape when seen as a whole.

Moreover, the filter components 86 have a filter internal space 864 where brake fluid circulates, and the valve 84 and the spring 87 are disposed in the filter internal space 864.

Furthermore, the valve seat passage 851 and the filter internal space 864 can communicate to each other.

The sleeve 88 has a bottomed cylindrical shape, and a sleeve projection 881 projected toward outside in the radial direction is formed continuously in a circumferential direction at a perimeter surface of the sleeve 88.

Moreover, the sleeve 88 has a sleeve space 882 therein where brake fluid circulates, and the sleeve space 882 is communicated with the filter internal space 864.

Furthermore, the sleeve passage 883 where brake fluid circulates is formed in a base of the sleeve 88, and the sleeve passage 883 is communicated with the valve seat passage 851.

Each of the filter components 86 are integrated by press-fitting the valve seat 85 to an opening part of the filter components 86 after accommodating the spring 87 and the valve 84 in the filter internal space 864 of the filter components 86, and the filter components 86 becomes a unit by inserting the integrated filter components 86 in the sleeve space 882 of the sleeve 88.

This unit is fixed in the second reservoir hole 42 by press-fitting the sleeve 88 into the second reservoir hole 42 of the housing 40.

Moreover, a contacting part of the sleeve projection 881 and the inner wall surface of the housing 40 constitute a sealing part 90, and the conduit line B and the conduit line D are separated by the sealing part 90.

In addition, the housing 40 is made of nonferrous metal, such as aluminum, for example, and the sleeve 88 is made of, for example, iron-based metal.

Here, the sleeve 88 as a first component moves toward a bottom of the second reservoir hole 42 from an opening of the second reservoir hole 42, and is press-fit thereto.

Hereinafter, a moving direction of the sleeve 88 when the sleeve 88 is press-fit is called a press-fitting direction E (refer to an arrow in FIG. 3).

A housing projection 45 as a deformation suppressing part is projected toward opposite to the press-fitting direction E is formed at a bottom of the second reservoir hole 42 in the housing 40 as a second component.

A contacting surface 451, which is a surface on a perimeter of the housing projection 45, is formed in a tapered shape so as to widen along with the press-fitting direction E.

Although a tip side in the press-fitting direction E of the sleeve 88 tends to deform inwardly in the radial direction and escape from the housing 40 in the process of press-fitting the sleeve 88 into the second reservoir hole 42 of the housing 40, since an inner slant part of the tip side of the sleeve 88 contacts to the contacting surface 451, a deformation of the tip side of the sleeve 88 is suppressed.

Moreover, when the sleeve 88 is further pushed in after the inner slant part of the tip side of the sleeve 88 contacts to the contacting surface 451, the tip side of the sleeve 88 is widened outwardly in the radial direction by the taper-shaped contacting surface 451.

Therefore, the surface pressure of the sealing part 90 is fully obtained.

The base wall surface of the piston 81 has a shaft 89 projected toward the second reservoir hole 42 side from the base wall surface of the piston 81.

The shaft 89 is inserted in the sleeve passage 883 and the valve seat passage 851, and a tip of the shaft 89 faces the valve 84.

In addition, a pressure regulating valve 8A is constituted by the valve 84, the valve seat 85, and the sleeve 88 mentioned above including the shaft 89.

The conduit line D is connected to the sleeve space 882 in a side of the sealing part 90 opposite to the reservoir chamber 44, and is further connected to the reservoir chamber 44 through the filter internal space 864, the valve seat passage 851, and the sleeve passage 883.

In addition, the sleeve space 882, the filter internal space 864, the valve seat passage 851, and the sleeve passage 883 constitute connecting passages.

Moreover, the valve seat 85, the filter components 86, and the sleeve 88 constitute a pressure regulating valve body.

The release slot 43 that constitute a part of the conduit line B is connected to the reservoir chamber 44.

More specifically, the release slot 43 is formed between a perimeter surface of the sleeve 88 and the inner wall surface of the housing 40 in a side of the reservoir chamber 44 opposite to the sealing part 90 among the perimeter surface of the sleeve 88.

The pressure regulating reservoir 8 is constituted as mentioned above.

In the pressure regulating reservoir 8 constituted in this way, the piston 81 is pushed upwardly in FIG. 3, for example, by a pressing force of the spring 82 during the normal braking.

Therefore, the valve 84 is separated from the valve seat surface 852 by the valve 84 being pushed by the shaft 89, and between the filter internal space 864 and the valve seat passage 851 becomes in an open mode.

For this reason, when the brake fluid is supplied through the conduit line D, the brake fluid is reserved in the reservoir chamber 44 through the sleeve space 882, the filter internal space 864, the valve seat passage 851, and the sleeve passage 883.

The brake fluid stored in this reservoir chamber 44 is supplied to the wheel cylinders 4 and 5 that correspond to the wheels that are subjected to the brake fluid pressure control by the brake fluid being sucked by the pump 10 through the release slot 43 that is a part of the conduit line B.

Then, the inflow of the brake fluid into the reservoir chamber 44 exceeds a sucked volume of the pump 10, and the brake fluid of specified volume is reserved in the reservoir chamber 44.

At this time, when an amount of slide of the piston 81 becomes larger than an amount of lift of the valve 84, the valve 84 contacts the valve seat surface 852.

By this, communication between the filter internal space 864 and the valve seat passages 851 is closed, and the inflow of the brake fluid through the conduit lines B and C to the reservoir chamber 44 is regulated.

Thus, the brake fluid is prevented from flowing into a position where the piston 81 is at a bottom dead center in the reservoir chamber 44, and high-pressured brake fluid in an upstream side of the pressure regulating reservoir 8 (conduit line D side) is not supplied directly to the pump 10 located in the downstream side (conduit lines B and C side).

Next, operation of the braking system that has the pressure regulating reservoir 8 constituted in this way is explained.

First, during normal braking when the ABS control and an assist control are not performed, the differential pressure controlling valve 7 is in the open mode.

Therefore, the master cylinder pressure generated by stepping on the brake pedal 1 by the driver comes to be applied to the wheel cylinders 4 and 5 directly.

Since the pump is not driven at this time, the valve 84 is located so as to contact the valve seat 85, and the master cylinder pressure is not applied to a suction port side of the pump 10.

Then, when a braking effort is required to be higher than during normal braking such as when a vehicle deceleration detected by an accelerometer etc. (not shown) exceeds a predetermined threshold, i.e., when the brake fluid pressure is required to be generated so that the stepping of the brake pedal 1 by the driver may be assisted, the differential pressure controlling valve 7 enters the differential pressure mode.

Thereby, the brake fluid from the conduit line A1 flows into the pressure regulating reservoir 8 through the conduit line D.

Then, the brake fluid is supplied to the conduit line A2 by the sucking and discharging of the brake fluid in the pressure regulating reservoir 8 by the pump 10, and the wheel cylinder pressure is maintained to be higher than the master cylinder pressure by the differential pressure controlling valve 7 that is in the differential pressure mode.

When a specified amount of the brake fluid is reserved in the reservoir chamber 44 because the pump suction capability does not catch up with the amount of brake fluid flowing into the reservoir chamber 44, the valve 84 contacts to the valve seat surface 852, and closes the conduit line A1 (master cylinder side) and the suction port side of the pump 10.

When the brake fluid in the reservoir chamber 44 is sucked by the pump 10, the amount of brake fluid in the reservoir chamber 44 decreases and the shaft 89 pushes up the valve 84, thus the brake fluid is supplied to the reservoir chamber 44 from the master cylinder side.

Since the deformation on the tip side of the sleeve 88 is suppressed by the housing projection 45 in the process of press-fitting the sleeve 88 into the second reservoir hole 42 of the housing 40 in the present embodiment as mentioned above, the surface pressure of the sealing part 90 is fully obtained, and the airtightness of the sealing part 90 can be secured reliably.

Moreover, since the sleeve 88 has the sleeve projection 881, seal performance of the sealing part 90 can be improved by raising a surface pressure of the sealing part 90.

Other Embodiments

The present disclosure is not limited to the above-mentioned embodiments, and can be suitably modified within limits of the scope of the present disclosure.

Moreover, in the above-mentioned embodiment, it cannot be overemphasized that the elements that constitute an embodiment are not necessarily indispensable except for cases where it is clearly shown that the elements are especially indispensable, or where the elements are theoretically and clearly indispensable.

Further, in the above-mentioned embodiment, when numerical values, such as a number of components, a value, a quantity, and a range of an embodiment are mentioned, it is not limited to the specific number except for cases where it is clearly shown that the numerical values are especially indispensable, or where the numerical values are clearly and theoretically limited to a specific number.

Moreover, in the above-mentioned embodiment, when shapes of a component etc., or spatial relationships, etc., are mentioned, it is not limited to a particular shape or spatial relationship, etc. except for cases where it is clearly shown, or where it is theoretically limited to specific shape or spatial relationship, etc.

What is claimed is:

1. A pressure regulating valve comprising:
    a first component having a cylindrical shape;
    a second component that has a bottomed hole in which the first component is press-fit and has two conduit lines that open to the bottomed hole; and
    a valve disposed within the first component for controlling a fluid flow between the two conduits; wherein,
    a tip side in the press-fitting direction of the first component is in contact with a bottom of the second component, and
    the second component has a deformation suppressing part that suppresses the tip side in the press-fitting direction of the first component from deforming inwardly in a radial direction of the first component.

2. The pressure regulating valve according to claim 1; wherein,
    a sleeve projection projecting outwardly in the radial direction of the first component is formed continuously in a circumferential direction at a perimeter surface of the first component; and
    a sealing part is formed by a press-contact of the sleeve projection and an inner periphery of the bottomed hole of the second component.

3. The pressure regulating valve according to claim 1; wherein,
    the deformation suppressing part has a contacting surface formed in a tapered shape so as to widen along with the press-fitting direction of the first component.

4. The pressure regulating valve according to claim 2; wherein,
    the deformation suppressing part has a contacting surface formed in a tapered shape so as to widen along with the press-fitting direction of the first component.

* * * * *